United States Patent
Feltner et al.

(10) Patent No.: US 6,219,548 B1
(45) Date of Patent: Apr. 17, 2001

(54) SUPPORT FOR TRANSFER OF NEIGHBORING CELL INFORMATION BETWEEN MSC AREAS FOR VGCS/VBS CALLS

(75) Inventors: Charles M. Feltner, Plano; Shahrokh Amirijoo, Richardson, both of TX (US)

(73) Assignee: Ericsson Inc, Research Triangle Park, NC (US)

( * ) Notice: Subject to any disclaimer, the term of this patent is extended or adjusted under 35 U.S.C. 154(b) by 0 days.

(21) Appl. No.: 09/218,907

(22) Filed: Dec. 22, 1998

(51) Int. Cl.[7] .............................. H04Q 7/20; H04Q 7/22; H04Q 7/36

(52) U.S. Cl. .......................... 455/433; 455/435; 455/434; 455/517; 455/518; 455/519; 455/520; 455/403; 455/552

(58) Field of Search ..................................... 455/433, 432, 455/435, 426, 412, 403, 422, 550, 552, 517, 518, 519, 520, 434

(56) References Cited

U.S. PATENT DOCUMENTS

| | | | |
|---|---|---|---|
| 5,724,648 | * 3/1998 | Shaughnessy et al. | 455/433 |
| 5,752,196 | * 5/1998 | Ahvenainen et al. | 455/518 |
| 5,953,673 | * 9/1999 | Neubauer et al. | 455/433 |
| 5,987,331 | * 11/1999 | Grube et al. | 455/519 |
| 6,097,942 | * 8/2000 | Laiho | 455/518 |

* cited by examiner

Primary Examiner—William G. Trost
Assistant Examiner—Keith Ferguson
(74) Attorney, Agent, or Firm—Jenkens & Gilchrist

(57) ABSTRACT

A system, method, and apparatus for updating Group Call Registers (GCR) is presented, wherein modifications to group call areas are transmitted to neighboring Mobile Switching Center/Visitor Location Register (MSC/VLR) service areas. Information regarding cells which are either added to, removed from a group, or part of a new or terminated group is transmitted to any neighboring MSC/VLR service areas adjacent to the cell. In one embodiment, the information is transmitted over the Signaling System 7 (SS7) Network. In a second embodiment, the information is sent over a network connecting the GCRs.

13 Claims, 5 Drawing Sheets

SUPPORT FOR TRANSFER OF NEIGHBORING CELL INFORMATION BETWEEN MSC AREAS FOR VGCS/VBS CALLS

BACKGROUND AND OBJECTS OF THE PRESENT INVENTION

In addition to providing telephonic services, wireless telecommunications networks provide a number of supplementary services. One such service is a group call, wherein a member of a predefined group can set up a call to each member of the group. For example, in response to an emergency, a law enforcement dispatcher can notify law enforcement personnel of the emergency using a group call, where the law enforcement personnel and dispatcher are members of a common group.

Services supporting group calls include Voice Broadcast Service (VBS) and Voice Group Call Service (VGCS). VBS allows a subscriber to broadcast a voice call to each of the mobile stations in the group. However, a voice broadcast is entirely a downlink transmission wherein the receiving mobile stations are unable to transmit communications. Voice Group Call Service is a group call wherein each participating member can broadcast to the other members of the group.

Ordinarily, a group call is set up for each member of the group, regardless of their location. Therefore, a group conference could be established in which members are dispersed over a large area, which can be a disadvantage in the situation where the initiator of the group call needs to reach only the members of the group within a certain area. To limit the group call to a particular area, a list of the cells in which members of the group are to be called is maintained by each mobile switching center (MSC). The list of cells are collectively known as the group call area. Members outside the group call area are not called. The list of cells is stored in a database, known as a Group Call Register (GCR) that stores any number of group identification numbers, followed by identifiers of the particular cells in which members of the identified group are to be called.

When a group call is requested to be established by a mobile station belonging to a particular group, the MSC serving the mobile station retrieves the list of cells in the group's group call area. The MSC causes a notification message to be transmitted by a Base Station System over a control channel in each cell of the group call area. The notification alerts the mobile stations of the group call, identifies the group to receive the call, and identifies the traffic channel for the call. Subscribers at mobile stations belonging to the group are alerted and can then receive the group call by tuning to the indicated traffic channel.

Because only cells within a particular group call area receive a group call, handoff procedures for mobile stations engaged in a group call are modified. When a mobile station engaged in a phone call traverses the area of one cell to another cell, the base transceiver station must be changed. To assist in the process, the mobile station periodically measures the signal strengths received from neighboring cells. Information regarding the neighboring cells is provided by a neighboring cell list transmitted to the mobile station from the Base Station System. When the signal strength of a base transceiver station from a neighboring cell exceeds the signal strength from the cell serving the mobile station, the mobile station switches service to the base transceiver serving the neighboring cell. The foregoing has been standardized into a procedure known as Mobile Assisted Handoff (MAHO).

However, when a mobile station is engaged in a group call, the neighboring cell list must be modified. Because cells that are outside the group call area do not receive the group call, a handoff to a cell outside the group call area would disconnect the mobile station from the group call. Therefore, the neighboring cell list must exclude neighboring cells that are outside the group call area. The foregoing is accomplished by removing cells from the neighboring cell list which are not found in the GCR.

Although a particular group call area may be confined to a particular region, and is usually smaller than an MSC/VLR service area, a group call area may include cells of a number of MSC/VLR service areas. For example, a group call area close to a border between neighboring MSC/VLR service areas may include cells within the neighboring MSC/VLR service areas. Therefore, a GCR must not only contains lists of cells that are within the MSC/VLR service area, but must also include cells adjacent to the MSC/VLR service area but within the group call area.

As group call areas are added or expanded, the GCR must be constantly maintained and updated. However, because a GCR must include cells outside the MSC/VLR service area, adding a particular cell to a group call area can require several GCRs to be updated to include the added cell in the group call area. Updates to a GCR can be performed manually by an operator. However, as an increasing number of changes occur, manual changes by an operator become tedious and error-prone.

Accordingly, it is an object of the present invention to provide a mechanism to more efficiently update group call registers with changes in group call areas.

SUMMARY OF THE INVENTION

The present invention is directed to a system, method, and apparatus for updating a Group Call Register (GCR) in one mobile switching center/visitor location (MSC/VLR) service area when a particular cell in a second MSC/VLR service area is added to a group call area of the same group. The MSC serving the cell determines whether the particular cell is adjacent to the first MSC/VLR service area. Where the cell is adjacent to the first MSC/VLR service area, a packet of information is sent to update the GCR of the first MSC/VLR service area.

BRIEF DESCRIPTION OF THE DRAWINGS

The disclosed inventions will be described with reference to the accompanying drawings, which show sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
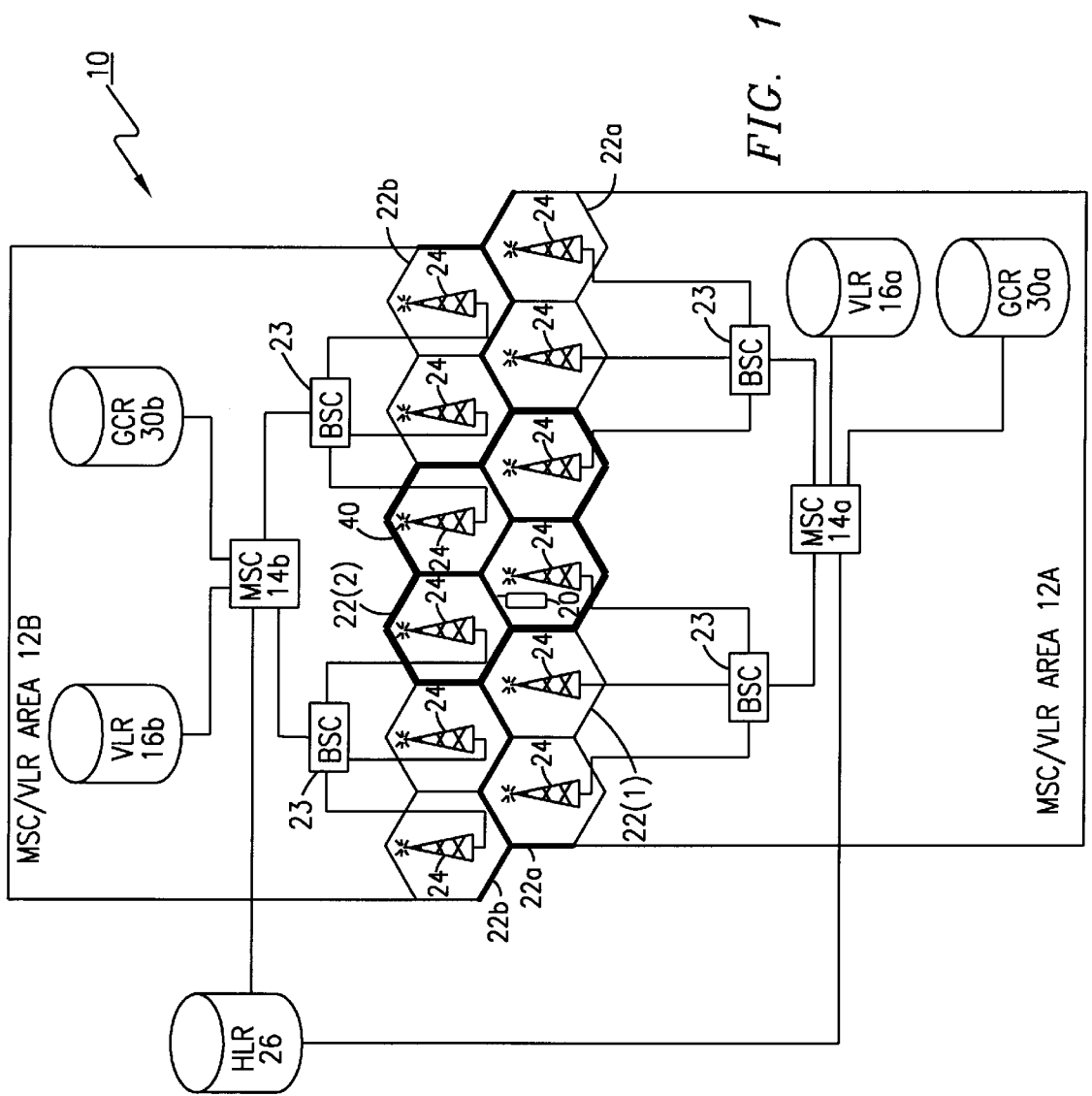
FIG. 1 is an exemplary wireless network embodying the present invention.

With reference now to FIG. 1 of the drawings, there is illustrated a GSM.Public Land Mobile Network (PLMN), such as wireless network 10, which in turn is composed of a plurality of MSC/VLR service areas 12, each with a Mobile Services Center (MSC) 14 and an integrated Visitor Location Register (VLR) 16 therein. The MSC/VLR areas 12 are defined as the area in which a mobile station (MS) 20 may move freely without having to send update location information to the MSC/VLR area 12. Each MSC/VLR service area 12 is divided into a number of cells 22. Mobile Station (MS) 20 is the physical equipment, e.g., a car phone or other portable phone, used by mobile subscribers to communicate with the wireless network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to the geographical part of the cell 22 for which it is responsible. It should be understood that the BSC 23 may be connected to several BTSs 24, and may be implemented as a stand-alone node or integrated with the MSC 14. In either event, the BSC 23 and BTS 24 components, as a whole, are generally referred to as a Base Station System (BSS).

With further reference to FIG. 1, the PLMN Service Area or wireless network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from its home HLR database 26 (simultaneously informing the HLR 26 about the current location of the MS 20). Accordingly, if the user of the MS 20 then wants to make a call, the local VLR 16 will have the requisite identification information without having to reinterrogate the home HLR 26. In the aforedescribed manner, the VLR and HLR databases 16 and 26, respectively, contain various subscriber information associated with a given MS 20.

Currently, additional subscriber services can be provided by adding an overlay to an existing cellular network 10. One such service is a group call, wherein a member of a predefined group can set up a call to each member of the group. For example, in response to an emergency, a law enforcement dispatcher can notify law enforcement personnel of the emergency using a group call, where the law enforcement dispatcher and personnel are members of a common group.

Services supporting group calls include Voice Group Call Service (VGCS) and Voice Broadcast Service (VBS). VBS allows a subscriber to broadcast a voice call to each of the mobile stations in the group. However, a voice broadcast is entirely a downlink transmission wherein the receiving mobile stations are unable to transmit communications. Voice Group Call Service is a group call wherein each participating member can broadcast to the other members of the group.

Ordinarily, a group call is set up for each member of the group, regardless of their location. Therefore, a group conference could be established in which members are dispersed over a large area which can be a disadvantage in the situation where the initiator of the group call needs to reach only the members of the group within a certain area. To limit the group call to a particular area, a Group Call Register (GCR) 30 in each MSC/VLR service area 12 maintains a list of cells 22 for which members of the group are to be called. The cells 22 together form what is known as the group call area 40. The GCR 30 is a database that stores any number of group identification numbers, followed by identifiers of the particular cells 22 in which members of the identified group are to be called. Members outside the group call area 40 are not called.

When a group call is requested to be established by an MS 20, the MSC 14 serving the MS 20 obtains a list of the cells to participate in the specific group call from the GCR 30. The MSC 14 then sends an assignment message for each cell 22 of the group call area 40, requesting the BSC 23 to establish a group call channel. Information about which BSC internal cells belong to the area of the group call are extracted from the assignment messages.

The BSC 23 controls the radio resources allocated to the group calls. Once the BSC 23 establishes a group call channel, the BSC 23 sends notification messages to notify the group members of the group call and identify the group call channel. After receiving the notification message, the MS 20 belonging to group members can tune to the channel specified in the notification message, the group call channel. The group call channels for each BSC 23 are bridged together as one signal at the MSC 14.

Because only cells 22 within a particular group call area 40 receive a group call, handoff procedures for MSs 20 engaged in a group call are modified. When an MS 20 engaged in a phone call traverses the area of one cell to another cell, the BTS 24 must be changed. To assist in the process, the MS 20 periodically measures the signal strengths received from neighboring cells 22. Information regarding the neighboring cells 22 is provided by a neighboring cell list transmitted to the MS 20 from the base station system. When the signal strength from a neighboring cell 22 exceeds the signal strength from the cell serving the MS 20, the MS switches service to the BTS 24 serving the neighboring cell 22. The foregoing has been standardized into a procedure known as Mobile Assisted Handoff (MAHO).

However, when a mobile station is engaged in a group call, the neighboring cell list must be modified. Because cells 22 that are outside the group call area 40 do not receive the group call, a handoff to a cell outside the group call area would disconnect the MS 20 from the group call. Therefore, the neighboring cell list must exclude neighboring cells 22 that are outside the group call area. The foregoing is accomplished by removing cells 22 from the neighboring cell list which are not found in the GCR 30.

Although a particular group call area 40 may be confined to a particular region, and is usually smaller than an MSC/VLR service area 12, a group call area 40 may include cells 22 of a number of MSC/VLR service areas, 12a, 12b. For example, a group call area 40 close to a border between neighboring MSCs 12a, 12b may include cells 22 within the neighboring MSCs. Therefore, a GCR 30 must not only contains lists of cells that are within the MSC/VLR service area 12, but must also include cells 22 adjacent to the MSC/VLR service area 12 but within the group call area 40.

As group call areas 40 are added or expanded, the GCR 30 must be constantly maintained and updated. However, because a GCR 30 must include cells outside the MSC/VLR service area 12, adding a particular cell 22 to a group call area 40 can require several GCRs to be updated to include the added cell in the group call area. For example, if the cell 22(1), is added to the group call area 40 of a particular group, the GCR 30a of the MSC/VLR service area 12a for the cell. Additionally, because cell 22(1) is a neighboring cell to cell 22(2) within MSC/VLR service area 12a, GCR 30b must also be updated.

Instead of updating the GCR 30 manually by an operator, the present invention proposes a communications system wherein GCRs 30a, 30b communicate and transfer neighboring cell data to other GCRs in response to an update. In one embodiment, the MSC 14 determines the appropriate GCR(s) to update in response to a change in a group call area 40 for a particular group, and transmits a signal over the currently existing Signaling System 7 (SS7) network. In another embodiment, changes to a group call area 40 are transmitted over a network connecting all of the GCRs 30.

Figure 2:
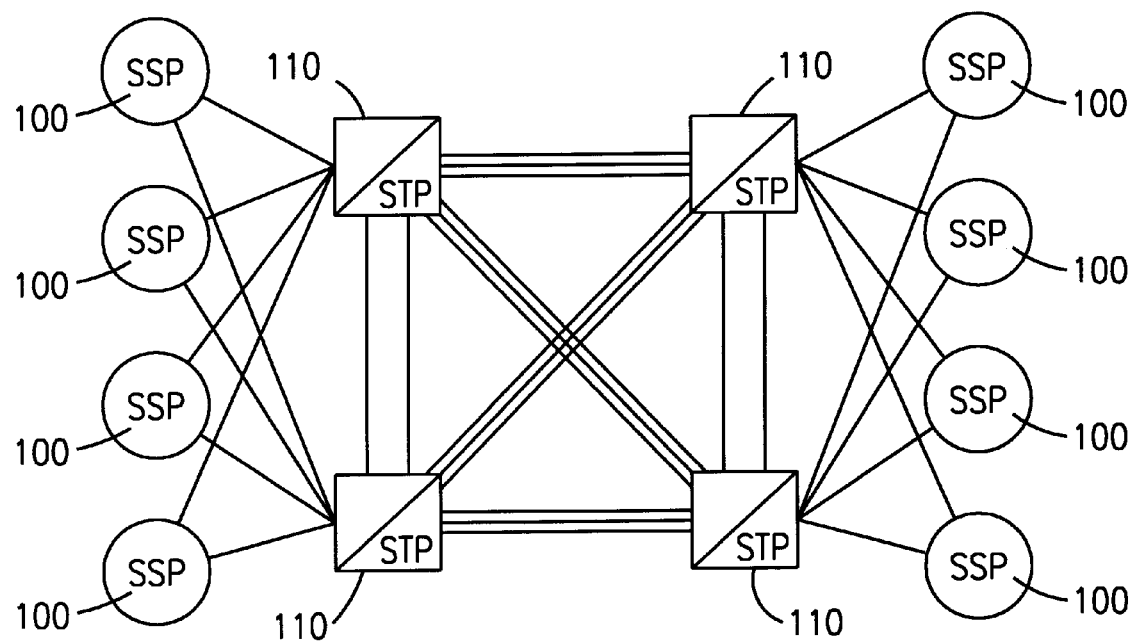
FIG. 2 is an exemplary network of Service Switching Points (SSPs) in which the present invention can be implemented.

Referring now to FIG. 2, there is illustrated an exemplary network 150 of Service Switching Points (SSPs) 100 in which the present invention can be implemented. The network 150 can comprise, for example, the Signaling System 7 (SS7) network. Each SSP serves as an MSC (such as 14 in FIG. 1) in a telephone network 190. The SSPs 100 also provide an Integrated Services Digital Network (ISDN) User Part(ISUP) protocol for Signal Transfer Points (STPs) 110, as is understood in the art.

Each STP 110 serves as a router, and switches messages received from a particular SSP 100 through the network 190 to their appropriate destinations (another SSP 100). It should be understood that the STPs 110 preferably receive such messages in packet form from the SSPs 100. These packets are either related to call connections or database queries. If the packet is a request to connect a call, the message is forwarded to a destination end office (another SSP 100), where the call will be terminated.

When GCR 30a is updated in response to a change in a particular group call area 40, the MSC 14a determines, which, if any, GCRs 30 of neighboring MSC/VLR service areas 12 must be updated. Where an update must be made in a neighboring MSC/VLR service area 12, the MSC 14 encapsulates information regarding the update into a packet, such as an ISUP packet, and transmits the packet to the MSC associated with the GCR 30 to be updated. The packet is transmitted over the network 150 to the SSP 100 serving as the MSC 14 associated with the GCR 30 to be updated.

Figure 3:
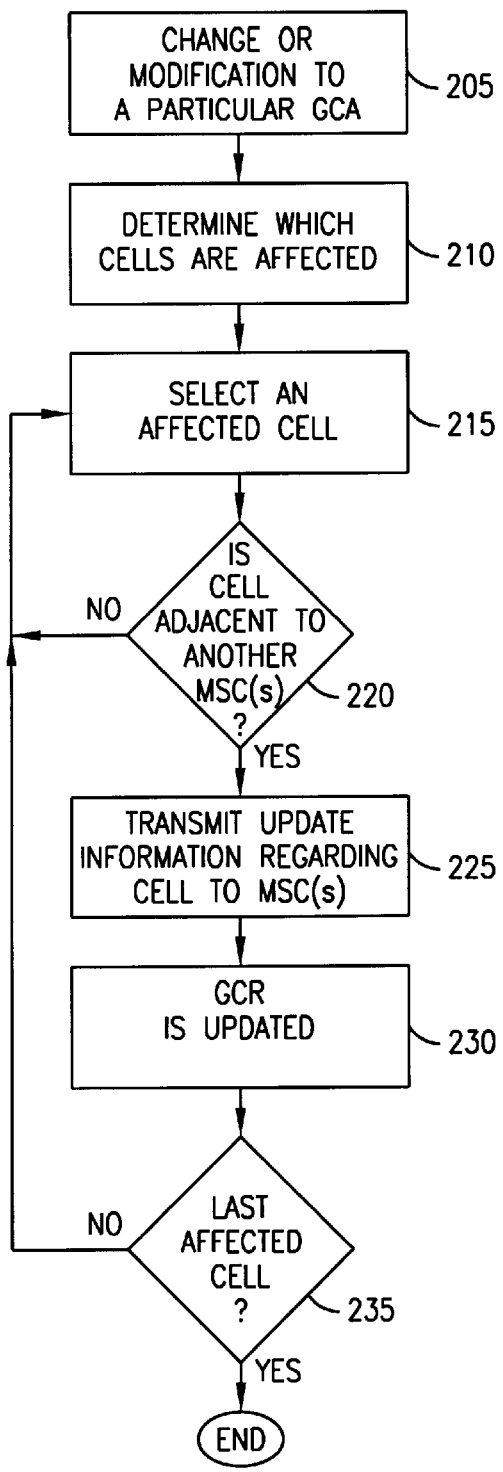
FIG. 3 is a flow diagram describing the operation of the mobile switching center in accordance with the principals of the present invention.

Referring now to FIG. 3, there is illustrated a flow diagram describing the operation of MSC 14a in accordance with the principals of the present invention. The operation of MSC 14a will be described in the exemplary case where cell 22(1) is added to a particular group call area 40. At step 205, a change or modification is made to GCR 30a regarding the addition of cell 22(1) to group call area 40. After the change is made, the MSC 14a determines which cell(s) 22 are affected (step 210). A cell 22 is affected if the cell is either added to the group call area 40, deleted from the group call area. In the current exemplary case, cell 22(1) is affected because cell 22(1) is added to group call area 40. For each affected cell 22, the MSC 14a determines whether an update regarding the cell 22 must be sent to additional GCR(s) 30. The MSC 14a determines whether an update regarding the cell 22 must be sent to additional GCR(s) 30, by determining whether the affected cell 22 is adjacent to a neighboring MSC/VLR service area 12 (step 220).

Where an affected cell 22 is found to be adjacent to a neighboring MSC/VLR service area(s) 12, information regarding the affected cell 22, the group call area 40, and the group are encapsulated into a packet and transmitted over the network 150 to each MSC 14 of the neighboring MSC/VLR service area(s) 12 which are adjacent to the affected cell (step 225) which updates the associated GCR(s) 30 (step 230). On the other hand, where an affected cell 22 is not found to be adjacent to a neighboring MSC/VLR service area 12 (during step 220), no packet is sent. The foregoing (steps 220, 225) is performed for each affected cell (steps 215, 235).

In the present exemplary case, during step 220, cell 22(1) is adjacent to MSC/VLR service area 12b. Therefore, a packet of information regarding cell 22(1), group call area 40, and the group are encapsulated into a packet that is transmitted from MSC 14a to the MSC of MSC/VLR service area 12b, MSC 14b. The MSC 14b then modifies the list of cells in the GCR 30b for the group.

Figure 4:
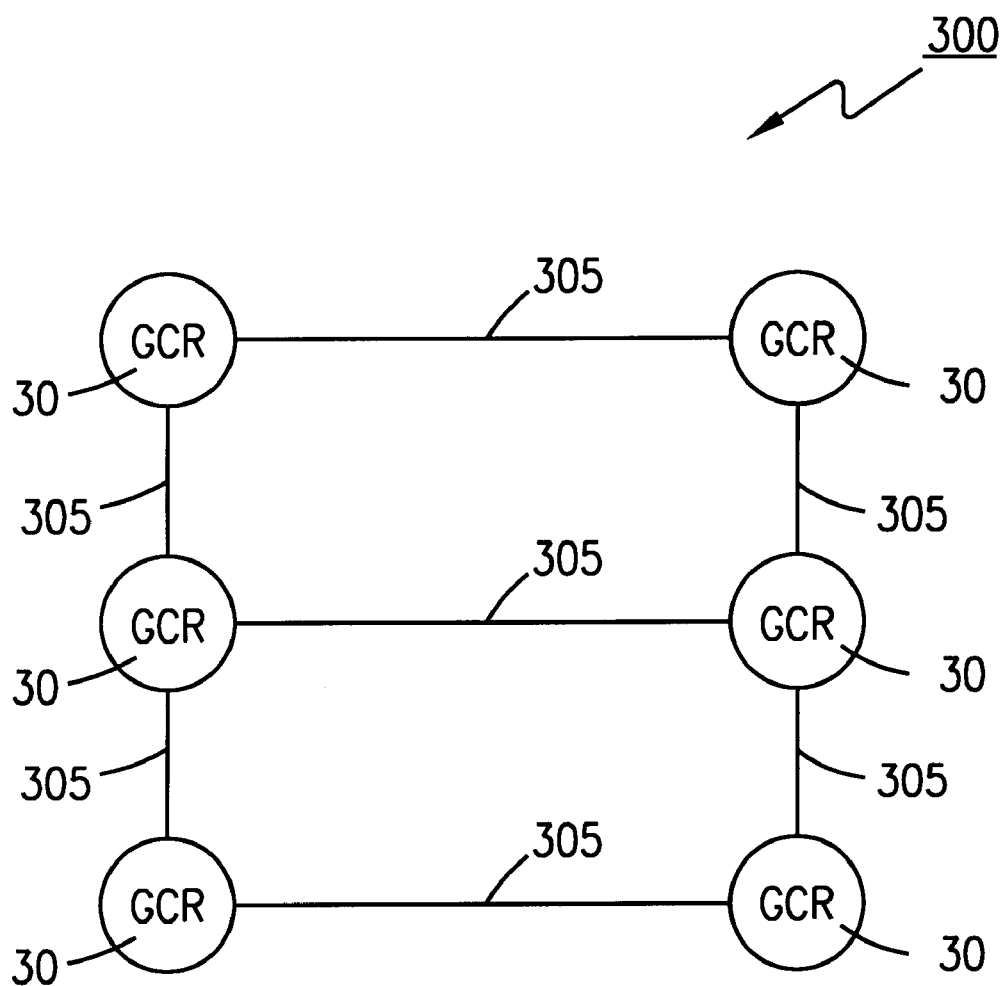
FIG. 4 is an exemplary network in which an alternative embodiment of the invention can be implemented.

Referring now to FIG. 4, there is illustrated an exemplary network 300 in which an alternative embodiment of the invention can be implemented. The network 300 includes a plurality of GCR(s) 30 interconnected via Transmission Control Protocol/Internet Protocol (TCP/IP) links 305. When GCR 30a is updated in response to a change in a particular group call area 40, the MSC 14a determines, which, if any, GCRs 30 of neighboring MSC/VLR service areas 12 must be updated. Where an update must be made in a neighboring MSC/VLR service area 12, the MSC 14 causes the GCR 30 to encapsulates information regarding the update into a TCP/IP packet and transmit the packet to the GCR 30 to be updated. The packet is transmitted over the network 300 to the GCR 30 to be updated in accordance with the TCP/IP protocol.

Figure 5:
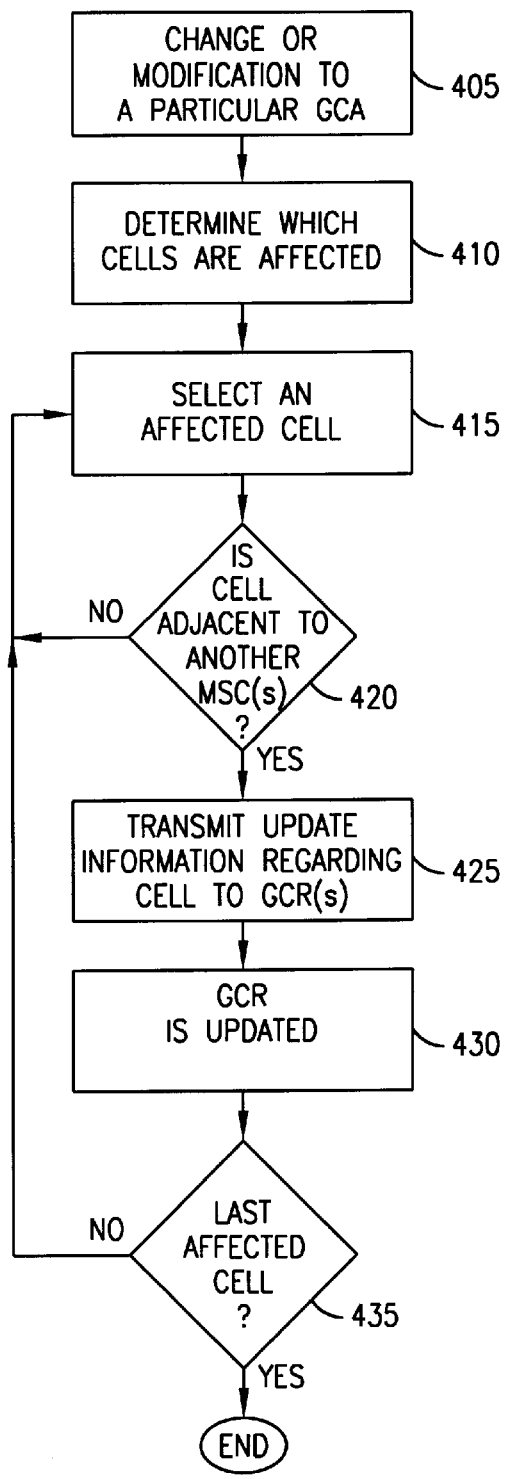
FIG. 5 is a flow diagram illustrating the operation of the network in FIG. 4 in accordance with the present invention.

Referring now to FIG. 5, there is illustrated a flow diagram describing the operation of the network 300 described in FIG. 4 in accordance with the principals of the present invention. The operation of the network 300 will be described in the exemplary case where cell 22(1) is added to a particular group call area 40. At step 405, a change or modification is made to GCR 30a regarding the addition of cell 22(1) to group call area 40. After the change is made, the MSC 14a determines which cell(s) 22 are affected (step 410). A cell 22 is affected if the cell is either added to the group call area 40, deleted from the group call area. In the current exemplary case, cell 22(1) is affected because cell 22(1) is added to group call area 40. For each affected cell 22, the MSC 14a determines whether an update regarding the cell 22 must be sent to additional GCR(s) 30. The MSC 14a determines whether an update regarding the cell 22 must be sent to additional GCR(s) 30, by determining whether the affected cell 22 is adjacent to a neighboring MSC/VLR service area 12 (step 420).

Where an affected cell 22 is found to be adjacent to a neighboring MSC/VLR service area(s) 12, information regarding the affected cell 22, the group call area 40, and the group are encapsulated into a TCP/IP packet and transmitted over the network 300 to the GCR(s) 30 of each neighboring MSC/VLR service area(s) 12 which are adjacent to the affected cell (step 425). The GCR(s) 30 of each neighboring MSC/VLR service area(s) 12 which are adjacent to the affected cell are then updated (step 430). On the other hand, where an affected cell 22 is not found to be adjacent to a neighboring MSC/VLR service area 12 (during step 220), no packet is sent. The foregoing (steps 420, 425) is performed for each affected cell (steps 415, 435).

In the present exemplary case, during step 420, cell 22(1) is adjacent to MSC/VLR service area 12b. Therefore, a packet of information regarding cell 22(1), group call area 40, and the group are encapsulated into a TCP/IP packet that is transmitted from GCR 30a to the GCR 30b of MSC/VLR service area 12b which modifies the list of cells for the group.

The present invention can also be used in cases where certain cells 22 are temporarily disabled. For example, during a period of heavy cellular traffic, a particular cell 22 in the group call area 40 may not be able to allocate a channel for a group call. Where a MS 20 is traversing the boundaries of another cell 22, the neighboring cell list must not include the disabled cell. The GCR 30 prevents inclusion of the disabled cell 22 in the neighboring cell list by modifying the group call area stored for the group therein. However, where the disabled cell 22, e.g, cell 22(2) is adjacent to a neighboring MSC/VLR service area 12, e.g., MSC/VLR service area 12a, the GCR 30a serving the MSC/VLR service area 12a must also modify the group call area record to prevent inclusion of cell 22(2).

Referring again to FIG. 5, there is illustrated a flow chart describing the operation of network 300 in accordance with the principals of the present invention in the exemplary case where cell 22(2) of group call area 40 is temporarily disabled. The disabling of cell 22(2) results in a modification to GCR 30b (step 405). After the change is made, the MSC 14b determines which cells are affected (step 410). Because cell 22(2) is temporarily deleted from the group call area, cell 22(2) is affected. For each affected cell 22(2), the MSC 14b determines whether an update regarding the cell 22(2) must be sent to additional GCR(s) 30, by determining whether the affected cell 22(2) is adjacent to a neighboring MSC/VLR service area 12 (step 420).

Where an affected cell 22(2) is found to be adjacent to a neighboring MSC/VLR service area(s) 12, information regarding the affected cell 22(2), the group call area 40, and the group are encapsulated into a TCP/IP packet and transmitted over the network 300 to the GCR(s) 30 of each neighboring MSC/VLR service area(s) 12 which are adjacent to the affected cell (step 425). The GCR(s) 30 of each neighboring MSC/VLR service area(s) 12 which are adjacent to the affected cell are then updated (step 430). On the other hand, where an affected cell 22 is not found to be adjacent to a neighboring MSC/VLR service area 12 (during step 220), no packet is sent. The foregoing (steps 420, 425) is performed for each affected cell (steps 415, 435).

In the present exemplary case, during step 420, cell 22(2) is adjacent to MSC/VLR service area 12a. Therefore, a packet of information regarding cell 22(2), group call area 40, and the group are encapsulated into a TCP/IP packet that is transmitted from GCR 30b to the GCR 30a of MSC/VLR service area 12a which modifies the list of cells for the group.

Although the invention has been described with a certain degree of particularity, it should be recognized that elements thereof may be altered by persons skilled in the art without departing from the spirit and scope of the invention. Therefore, the invention is limited only by the following claims and their equivalents.

What is claimed is:

1. In a first group call register (GCR) associated with a first mobile switching center/visitor location (MSC/VLR) service area, wherein said first GCR stores one or more indicators, each of said indicators identifying one or more cells, for a group, a method for updating said first GCR, said method comprising the steps of:

adding an indicator identifying a particular cell for a group to a second GCR associated with a second MSC/VLR service area;

determining whether said particular cell is adjacent to said first MSC/VLR service area; and adding an indicator identifying said particular cell for said group to said first GCR associated with said first MSC/VLR service area wherein said particular cell is adjacent to said first MSC/VLR service area.

2. The method of claim 1, wherein said step of adding an indicator identifying said particular cell for said group to said first GCR associated with said first MSC/VLR service area wherein said particular cell is adjacent to said first MSC/VLR service area, further comprises the step of:

transmitting a packet of information from second MSC/VLR service area to said first MSC/VLR service area, wherein said particular cell is adjacent to said first MSC/VLR service area, said information comprising an indicator identifying said particular cell;

adding said indicator identifying said particular cell for said group to said first GCR associated with said first MSC/VLR service area, responsive to said transmitting step.

3. The method of claim 2, wherein said step of transmitting said packet of information from said second MSC/VLR service area to said first MSC/VLR service area further comprises the step of:

transmitting said packet of information from an MSC associated with said second MSC/VLR service area to an MSC associated with said first MSC/VLR service area.

4. The method of claim 2, wherein said step of transmitting said packet of information from said second MSC/VLR service area to said first MSC/VLR service area further comprises the step of:

transmitting said packet of information over a Signaling System 7 network.

5. The method of claim 2, wherein said step of transmitting said packet of information from said second MSC/VLR service area to said first MSC/VLR service area further comprises the step of:

transmitting said packet of information from said second GCR to said first GCR.

6. The method of claim 2, wherein said step of transmitting said packet of information from said second MSC/VLR service area to said first MSC/VLR service area further comprises the step of:

transmitting said packet over a Transmission Control Protocol/Internet Protocol (TCP/IP) network.

7. A network for maintaining group location registers (GCR), said network comprising:

a first Group Call Register (GCR) associated with a first Mobile Switching Center/Visitor Location Register (MSC/VLR) service area;

a second Group Call Register (GCR) associated with a second Mobile Switching Center/Visitor Location Register (MSC/VLR) services area;

a signal link connecting said first GCR to said second GCR; and a Mobile Switching Center (MSC) connected to said first GCR, said MSC further comprising means for determining whether a particular cell is adjacent to said second MSC/GCR service area.

8. The network of claim 7, wherein said signal link connecting said first GCR to said second GCR further comprises a Transmission Control Protocol/Internet Protocol (TCP/IP) link.

9. In a telecommunications system comprising a Mobile Switching Center/Visitor Location Register (MSC/VLR) service area, a system for establishing group calls, said system comprising:

a first GCR associated with said MSC/VLR service area for storing one or more indicators, each of said indicators identifying one or more cells, for a plurality of groups, said first GCR further comprising means for adding an indicator identifying a particular cell for a group to said first GCR;

a first MSC for determining whether said particular cell is adjacent to another MSC/VLR service area; and a signal link connected to said MSC/VLR service area for transmitting a packet of information to said another MSC/VLR service area, wherein said particular cell is adjacent to said another MSC/VLR service area, said information comprising an indicator identifying said particular cell.

10. The system of claim 9, wherein said signal link connects said first GCR with a second GCR, said second GCR associated with said another MSC/VLR service area.

11. The system of claim 10, wherein said signal link comprises a Transmission Control Protocol/Internet Protocol link.

12. The system of claim 10, wherein said signal link connects said first MSC to a second MSC, said second MSC associated with said another MSC/VLR service area.

13. The system of claim 12, wherein said signal link comprises a Signaling System 7 (SS7) link.

* * * * *

UNITED STATES PATENT AND TRADEMARK OFFICE
CERTIFICATE OF CORRECTION

PATENT NO.  : 6,219,548 B1
DATED       : April 17, 2001
INVENTOR(S) : Feltner et al.

It is certified that error appears in the above-identified patent and that said Letters Patent is hereby corrected as shown below:

Column 1,
Line 6, insert -- Field of Invention --
Line 7, insert -- The present invention relates generally to wireless telecommunications systems, and more particularly to establishing a group call to mobile subscribers within a group and a particular area. --

Signed and Sealed this

Fourth Day of November, 2003

JAMES E. ROGAN
*Director of the United States Patent and Trademark Office*